United States Patent
Allen

(10) Patent No.: US 11,350,655 B2
(45) Date of Patent: Jun. 7, 2022

(54) ALL PURPOSE SEASONING SAUCE

(71) Applicant: Brenda Allen, Oakland, CA (US)

(72) Inventor: Brenda Allen, Oakland, CA (US)

(*) Notice: Subject to any disclaimer, the term of this patent is extended or adjusted under 35 U.S.C. 154(b) by 1039 days.

(21) Appl. No.: 15/686,069

(22) Filed: Aug. 24, 2017

(65) Prior Publication Data

US 2019/0059427 A1 Feb. 28, 2019

(51) Int. Cl.
*A23L 27/10* (2016.01)
*A23L 27/60* (2016.01)

(52) U.S. Cl.
CPC ............ *A23L 27/10* (2016.08); *A23L 27/105* (2016.08); *A23L 27/60* (2016.08); *A23V 2250/154* (2013.01); *A23V 2250/212* (2013.01)

(58) Field of Classification Search
CPC ........ A23L 27/10; A23L 27/00; A23L 27/105; A23L 27/60
USPC .......................................................... 426/589
See application file for complete search history.

(56) References Cited

U.S. PATENT DOCUMENTS

| 3,567,074 A * | 3/1971 | Brown ............... | B65D 75/5894 |
| | | | 222/107 |
| 5,641,533 A * | 6/1997 | Ambjerg Pedersen ...................... | |
| | | | A23L 27/60 |
| | | | 426/605 |
| 6,942,889 B2 * | 9/2005 | Contini ..................... | C12J 1/08 |
| | | | 426/589 |
| 2002/0025369 A1 * | 2/2002 | Haindl .................... | A23L 23/00 |
| | | | 426/589 |
| 2006/0286275 A1 * | 12/2006 | Salemme ................ | A23L 27/40 |
| | | | 426/649 |
| 2007/0026123 A1 * | 2/2007 | Stewart ................... | A23L 23/00 |
| | | | 426/589 |
| 2008/0206414 A1 * | 8/2008 | Sekula .................. | A23L 3/3508 |
| | | | 426/323 |
| 2010/0092648 A1 * | 4/2010 | Fischer .................. | A23L 23/00 |
| | | | 426/589 |

OTHER PUBLICATIONS

NPL Pepper vs weight [Retrieved on 2020] (Year: 2020).*
NPL abodo vs adobo [Retrieved on Sep. 9, 2020] (Year: 2020).*
NPL accent salt [Retrieved on Sep. 9, 2020] (Year: 2020).*
NPL Pepper vs weight [Retrieved on Sep. 9, 2020] (Year: 2020).*
NPL garlic bulb weight [Retrieved on Sep. 9, 2020] (Year: 2020).*
NPL Mina et al. (Food Sci Nutr. 2019;7:2471-2484) (Year: 2019).*
NPL Sauce (Retrieved on Jan. 22, 2021). (Year: 2021).*
NPL Abodo sauce (Retrieved on Mar. 28, 2022). (Year: 2022).*
Google scholar search (Retrieved on Mar. 28, 2022. (Year: 2022).*

* cited by examiner

*Primary Examiner* — Donald R Spamer
*Assistant Examiner* — Bhaskar Mukhopadhyay
(74) *Attorney, Agent, or Firm* — Patent PC; Bao Tran

(57) ABSTRACT

A flavoring condiment sauce for food comprised of about 19%-21% lemon juice, about 19%-21% water, about 12%-14% minced garlic, about 12%-14% butter or margarine, about 12%-14% onion, about 0.15%-0.5% Abodo sauce, about 2%-3% garlic powder, about 0.15%-0.5% seasoning salt, about 6%-8% black pepper, about 1%-2% crushed red pepper, and about 8%-10% Accent salt.

6 Claims, 1 Drawing Sheet

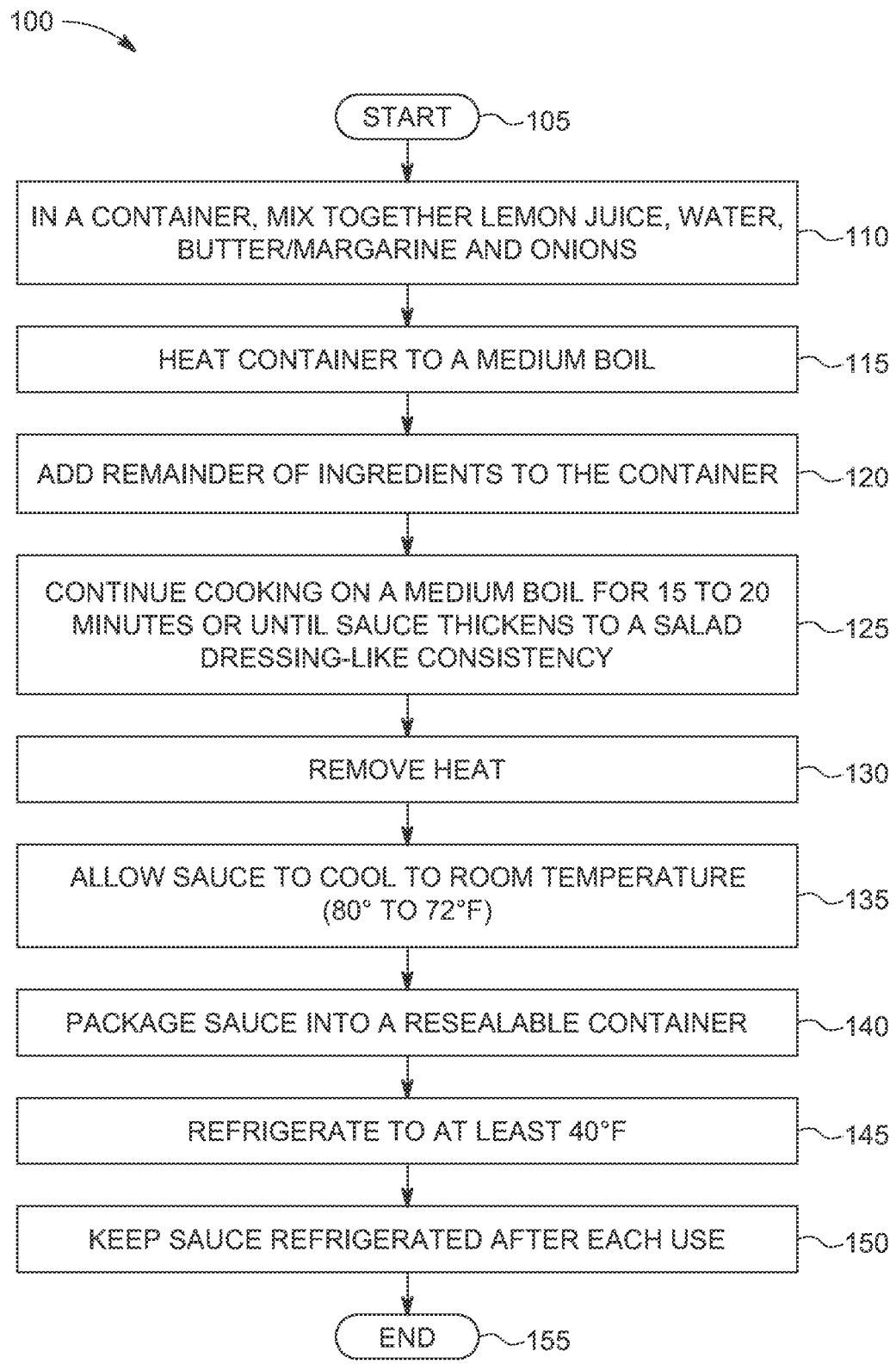

ALL PURPOSE SEASONING SAUCE

CROSS-REFERENCE TO RELATED APPLICATION(S)

Not applicable

BACKGROUND OF THE INVENTION

1. Field of Invention

The present invention relates to the field of food flavoring, more particularly to a condiment sauce suitable for use to flavor all types of food.

2. Description of Related Art

Food flavoring sauces of all types have been used over the years to flavor food and improve its tastes. Food flavoring sauces can promote good nutrition by enhancing the dinning experience and improving the taste of otherwise bland foods, Often, these sauces are really only intended for one type of food and lack versatility.

The invention offers a particularly versatile food flavoring sauce that can be added to any cooked food item and is simple to prepare.

Based on the foregoing, there is a need for a sauce with ease of preparation and versatility.

SUMMARY OF THE INVENTION

A flavoring condiment sauce for food comprised of about 19%-21% lemon juice, about 19%-21% water, about 12%-14% minced garlic, about 12%-14% butter or margarine, about 12%-14% onion, about 0.15%-0.5% Abodo sauce, about 2%-3% garlic powder, about 0.15%-0.5% seasoning salt, about 6%-8% black pepper, about 1%-2% crushed red pepper, and about 8%-10% Accent salt.

The flavoring condiment sauce further comprising between about 2%-21% chopped crab.

A method of preparing the ingredients in paragraph 0006 into a flavoring sauce that includes mixing together lemon juice, water, butter/margarine, and onions in a container. Heating the container to a medium boil. Adding remainder of ingredients to the heated container. Continuing cooking on a medium boil for 15 to 20 minutes or until sauce thickens to a salad dressing-like consistency. Removing heat, and allowing sauce to cool to room temperature (80° to 72° F.). Packaging sauce into a resealable container, and refrigerating to at least 40° F.

A method of preparing a flavoring sauce, comprising the steps of providing a container, mixing together lemon juice, water, butter/margarine, and onions and adding to container, heating the container to a medium boil, adding remainder of ingredients to the heated container, continuing cooking on a medium boil for 15 to 20 minutes or until sauce thickens to a salad dressing-like consistency, removing heat from the container, allowing sauce to cool to room temperature, packaging sauce into a resealable container, and refrigerating the packaged sauce.

The method of preparing a flavoring sauce of a paragraph 0009, wherein the ingredients comprise 19%-21% lemon juice, 19%-21% water, 12%-14% minced garlic, 12%-14% butter or margarine, 12%-14% onion, 0.15%-0.5% Abodo sauce, 2%-3% garlic powder, 0.15%-0.5% seasoning salt, 6%-8% black pepper, 1%-2% crushed red pepper, and 8%-10% Accent salt.

Advantages:
1. Improved flavor.
2. Improved versatility.
3. Improved method of manufacture.
4. Improved pediatric nutrition.
5. Reduced need to purchase other condiments.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 1 is a process flow diagram of the sauce preparation method, according to an embodiment of the present invention.

DETAILED DESCRIPTION OF PREFERRED EMBODIMENTS

Preferred embodiments of the present invention and their advantages may be understood by referring to FIG. 1, wherein like reference numerals refer to like elements.

Embodiments of the invention are discussed below with reference to the FIGURES. However, those skilled in the art will readily appreciate that the detailed description given herein with respect to these FIGURES is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

In an embodiment, the flavoring sauce of the invention comprises a mixture of various food items combined into a unique flavoring sauce. The following table list the ingredients making up the sauce and the relative amounts.

TABLE 1

| Ingredients | Basic Recipe | By Proportion | By Percentage |
| --- | --- | --- | --- |
| Lemon Juice | 1½ Cup | 71.4 | 20% |
| Water | 1½ Cup | 71.4 | 20% |
| Minced Garlic | 1 Cup | 47.6 | 13.3% |
| Butter | 1 Cup | 47.6 | 13.3% |
| Onion (yellow or white) | ½ Medium - sliced (i.e., 1 Cup) | 47.6 | 13.3% |
| Abobo Sauce | 1 teaspoon (.021 Cups) | 1 | .28% |
| Garlic Powder | 3 tablespoons (.188 Cups) | 9 | 2.52% |
| Seasoning Salt | 1 teaspoon (.021 Cups) | 1 | .28% |
| Black Pepper | ½ Cup | 23.8 | 6.66% |
| Crushed Red Pepper | ⅛ Cup | 5.3 | 1.49% |
| Accent Salt | ⅔ Cup | 31.7 | 8.87% |

Thus, in an embodiment, the sauce's ingredient can comprise by percentages in the amounts of about 19%-21% lemon juice, 19%-21% water, 12%-14% minced garlic, 12%-14% Butter (also includes margarine as used herein), 12%-14% Onion (sliced or diced), 0.15%-0.5% Abodo Sauce, 2%-3% Garlic Powder, 0.15%-0.5% Seasoning Salt, 6%-8% Black Pepper, 1%-2% Crushed Red Pepper, and 8%-10% Accent Salt.

FIG. 1 depicts a flow diagram according to an embodiment for preparing the sauce of the invention. The method starts at 105. As depicted in FIG. 1, step 110, in a container, mix together the lemon juice, water, butter/margarine, and onions. At step 115, heat container to a medium boil. Step 115 can include continuing to stir the ingredients at least occasionally. In step 120, add remainder of ingredients to the container. Continue cooking on a medium boil for 15 to 20 minutes or until sauce thickens to a salad dressing-like consistency in step 125, then remove heat in step 130. At step 135, allow sauce to cool to room temperature (80° to 72° F.). In step 140, package sauce into a resealable container, then refrigerate to at least 40° F. In step 150, keep refrigerated after each use. The process ends at step 155.

In an embodiment, the sauce can be used to add to a variety of prepared foods or raw vegetables and the like.

In an embodiment, the sauce can include at least ¼ cup of chopped crab, and can comprise up to about 21%.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A flavoring condiment sauce for food, comprising ingredients from:
   about 19%-21% lemon juice;
   about 19%-21% water;
   about 12%-14% minced garlic;
   about 12%-14% butter or margarine;
   about 12%-14% cut onion;
   about 0.15%-0.5% Abodo sauce;
   about 2%-3% garlic powder;
   about 0.15%-0.5% seasoning salt;
   about 6%-8% black pepper;
   about 1%-2% crushed red pepper; and
   about 8%-10% Accent salt
   wherein the percent is by amount, and wherein the ingredients are heated at a medium boil for about 15 to 20 minutes or until the flavoring condiment sauce thickens to a salad-dressing consistency.

2. The flavoring condiment sauce of claim 1, further comprising between about 2%-21% chopped crab.

3. A method of preparing the ingredients in claim 1 into a flavoring sauce, comprising the steps of:
   in a container, mixing together lemon juice, water, butter/margarine, Abodo sauce, and cut onions;
   heating the container to a medium boil;
   adding remainder of ingredients to the heated container;
   continuing cooking on a boil for 15 to 20 minutes or until sauce thickens to a salad-dressing consistency;
   removing heat;
   allowing sauce to cool to room temperature (80° to 72° F.);
   packaging sauce into a resealable container; and
   refrigerating to at least 40° F.

4. A method of preparing a flavoring sauce, comprising the steps of:
   mixing together lemon juice, water, butter/margarine, Abodo sauce, Accent salt, and cut onions and adding to a container;
   heating the container to a medium boil;
   adding remainder of ingredients to the heated container;
   continuing cooking on a boil for 15 to 20 minutes or until sauce thickens to a salad-dressing consistency;
   removing heat from the container;
   allowing sauce to cool to room temperature;
   packaging sauce into a resealable container; and
   refrigerating the packaged sauce.

5. The method of preparing a flavoring sauce of claim 4, wherein the ingredients, by amount, comprise:
   19%-21% lemon juice;
   19%-21% water;
   12%-14% minced garlic;
   12%-14% butter or margarine;
   12%-14% onion;
   0.15%-0.5% Abodo sauce;
   2%-3% garlic powder;
   0.15%-0.5% seasoning salt;
   6%-8% black pepper;
   1%-2% crushed red pepper; and
   8%-10% Accent salt.

6. The method of any of claim 3 and 4, further comprising applying ingredients as:

| Ingredients | Basic Recipe | By Proportion | By Percentage |
|---|---|---|---|
| Lemon Juice | 1⅓ Cup | 71.4 | 20% |
| Water | 1½ Cup | 71.4 | 20% |
| Minced Garlic | 1 Cup | 47.6 | 13.3% |
| Butter | 1 Cup | 47.6 | 13.3% |
| Onion (yellow or white) | ½ Medium - sliced (i.e., 1 Cup) | 47.6 | 13.3% |
| Abobo Sauce | 1 teaspoon (.021 Cups) | 1 | .28% |
| Garlic Powder | 3 tablespoons (.188 Cups) | 9 | 2.52% |
| Seasoning Salt | 1 teaspoon (.021 Cups) | 1 | .28% |
| Black Pepper | ½ Cup | 23.8 | 6.66% |
| Crushed Red Pepper | ⅓ Cup | 5.3 | 1.49% |
| Accent Salt | ⅔ Cup | 31.7 | 8.87% |

* * * * *